US012286821B2

(12) United States Patent
Peynot et al.

(10) Patent No.: US 12,286,821 B2
(45) **Date of Patent: *Apr. 29, 2025**

(54) VEHICLE DOOR HANDLE ASSEMBLY

(71) Applicant: U-Shin Italia S.p.A., Pianezza (IT)

(72) Inventors: Thomas Peynot, Pianezza (IT); Anthony Guerin, Pianezza (IT); Frédéric Citron, Pianezza (IT)

(73) Assignee: U-Shin Italia S.p.A., Pianezza (IT)

( * ) Notice: Subject to any disclaimer, the term of this patent is extended or adjusted under 35 U.S.C. 154(b) by 136 days.

This patent is subject to a terminal disclaimer.

(21) Appl. No.: 18/113,145

(22) Filed: Feb. 23, 2023

(65) Prior Publication Data

US 2023/0265691 A1 Aug. 24, 2023

(30) Foreign Application Priority Data

Feb. 23, 2022 (EP) .................................... 22158287
Aug. 24, 2022 (EP) .................................... 22191999
Jan. 23, 2023 (EP) .................................... 23152938

(51) Int. Cl.
*E05B 85/10* (2014.01)
*E05B 85/16* (2014.01)

(52) U.S. Cl.
CPC ............ *E05B 85/107* (2013.01); *E05B 85/16* (2013.01)

(58) Field of Classification Search
CPC ...... E05B 85/10; E05B 85/103; E05B 85/107; E05B 85/16; E05B 17/0041; E05B 77/42; E05B 5/00; E05B 5/03; E05B 5/006
See application file for complete search history.

(56) References Cited

U.S. PATENT DOCUMENTS 10,435,924 B1 * 10/2019 Salter ...................... E05B 81/78
10,435,926 B2 * 10/2019 Brown .................. E05B 85/103
(Continued)

FOREIGN PATENT DOCUMENTS

KR 102104888 * 4/2020
KR 102104888 B1 4/2020
KR 20210055107 A 5/2021

OTHER PUBLICATIONS

European Search Report and Written Opinion issued in corresponding EP Application 22 191 999.6, dated Jun. 16, 2023, 6 pages.
(Continued)

*Primary Examiner* — Gilbert Y Lee
*Assistant Examiner* — Yahya Sidky
(74) *Attorney, Agent, or Firm* — Burris Law, PLLC

(57) ABSTRACT

In a vehicle door handle assembly, a first lever rotates between a rest position where a first extremity is in a rest position, a deployed position where the first extremity is outside a bracket, and an opening position where the first lever actuates an opening lever. A second lever rotates between a rest position where a second extremity is in a rest position, an activation position where the second extremity lowers the second lever into the bracket, and a deployed position where the second extremity is outside the bracket. A return lever includes an elastic device biasing it to a first position. Rotation of the second lever to an activation position actuates rotation of the return lever from its first to a second position. Rotation of the return lever from its second to its first position actuates rotation of the second lever from its deployed position to its rest position.

20 Claims, 7 Drawing Sheets

(56) References Cited

U.S. PATENT DOCUMENTS

| | | | | |
|---|---|---|---|---|
| 10,794,096 | B2 | 10/2020 | Hamacher et al. | |
| 10,815,702 | B2 * | 10/2020 | Yoshino | E05B 85/103 |
| 11,214,994 | B2 | 1/2022 | Han et al. | |
| 2005/0280266 | A1 * | 12/2005 | Mueller | E05B 77/42<br>292/336.3 |
| 2020/0392771 | A1 | 12/2020 | Toyama | |
| 2022/0018168 | A1 * | 1/2022 | Cervone | E05B 85/16 |

OTHER PUBLICATIONS

European Search Report and Written Opinion issued in corresponding EP Application 22 158 287.7, dated Jul. 26, 2022, 4 pages.
European Search Report and Written Opinion issued in corresponding EP Application 23 152 938.9, dated Jun. 16, 2023, 6 pages.

* cited by examiner

VEHICLE DOOR HANDLE ASSEMBLY

CROSS-REFERENCE TO RELATED APPLICATIONS

This application claims priority to and the benefit of European Application No. 23152938.9 filed on Jan. 23, 2023, European Application No. 22191999.6 filed on Aug. 24, 2022, and European Application No. 22158287.7 filed on Feb. 23, 2022. The disclosures of the above applications are incorporated herein by reference.

FIELD

The present disclosure relates to a vehicle door assembly, in particular of the type with a handle translating from a rest position where the handle is retracted and a deployed position where the handle is deployed and can be taken in hand and opened.

BACKGROUND

The statements in this section merely provide background information related to the present disclosure and may not constitute prior art.

Vehicle door handle assemblies with a handle translating between a rest position and a deployed position are becoming more common and requested by manufacturers.

In order to translate between these two positions, such vehicle door handle assemblies are typically motorized by an electric actuator. Such electric vehicle door handle assemblies are expensive and are not suitable for entry-level vehicles due to their costs. Furthermore, these vehicle door handle assemblies may be blocked or unusable in case of electrical power supply failure.

the teachings of the present disclosure overcome these and other issues with typical door handle assemblies and provide an economic and mechanical alternative for vehicle door handle assemblies having a translative movement.

SUMMARY

This section provides a general summary of the disclosure and is not a comprehensive disclosure of its full scope or all of its features.

In one form, the present disclosure provides for a vehicle door handle assembly including a bracket and a handle, the handle including a first extremity and a second extremity opposed to the first extremity. The first extremity is connected to a first lever. The first lever is designed to be connected to an opening lever to open a latch of the vehicle door. The first lever is designed to rotate between a rest position where the first extremity of the handle is in a rest position, a deployed position where the first extremity of the handle is in a deployed position outside the bracket and an opening position where the first lever actuates the opening lever. The second extremity is connected to a second lever. The second lever is designed to rotate between a rest position where the second extremity of the handle is a rest position, an activation position where the second extremity of the handle lowers the second lever into the bracket, and a deployed position where the second extremity of the handle is in a deployed position outside the bracket. The vehicle door handle assembly also includes a return lever having a first extremity connected to the second lever. The return lever is designed to rotate between a first position and a second position. The return lever includes an elastic device passively bringing back the return lever to its first position. The rotation of the second lever to its activation position actuates the rotation of the return lever from its first to its second position, and the passive rotation of the return lever from its second to its first position actuates the rotation of the second lever from its deployed position to its rest position.

In variations of the vehicle door handle assembly of the above paragraph, which can be implemented individually or in any combination: the return lever may be connected to a delay element which slows down the passive rotation of the return lever from its second to its first position; the delay element may include at least one damper; the at least one damper may include a gearwheel and the extremity of the return lever connected to the at least one damper may include an arc portion with teeth engaged with the gearwheel; the extremity of the return lever connected to the at least one damper may include a portion without teeth in order to disconnect the return lever of the at least one damper before the return lever reaches its first position; the first lever may include an elastic device passively bringing back the first lever from its deployed position to its rest position; the second lever may include an elastic device passively rotating the second lever toward its deployed position; the connection between the first lever and the first extremity of the handle may be a pivot-slide connection; the first and second levers may be connected together with at least one first rod, the first rod transmitting the rotation of the second lever from its activation position to its deployed position to the first lever, rotating the first lever from its rest position to its deployed position; the first rod may include a pivot-slide connection with anyone of the first or second lever so that the first lever can rotate from its rest position to its deployed position or from its deployed position to its opening position without rotating the second lever; the second and the return levers may be connected together by a second and a third rods; the second rod may transmit the rotation of the second lever from its rest position to its activation position to the return lever, rotating the return lever from its first position to its second position; the third rod may transmit the rotation of the return lever from its second position to its first position to the second lever, rotating the second lever from its deployed position to its rest position; the second rod may include a pivot-slide connection with anyone of the second or return lever; the third rod may include a pivot-slide connection with anyone of the second or return lever; the handle may be configured to be pushed into the bracket for lowering the second lever in activation position; the handle may be configured to move in a rectilinear manner when pushing the handle into the bracket; the handle may be considered as a whole to be pushed by the user into the bracket and there is no rotation of the handle when a user is pushing on the handle; he handle may be configured to abut on a rest portion of the bracket in the activation position, the handle being distant from the rest portion when the first lever and second lever are both in rest position; there may be an activation clearance within the bracket so that the handle can be moved in a rectilinear manner from its rest position to the activation position; the handle may present an external side facing the outside of the bracket, any part of the external side being configured to be pushed towards the bracket for lowering the second lever in activation position; the handle may include a leg linking the first extremity and the second extremity, the leg, the first extremity and the second extremity are each presenting a corresponding portion of the external side; the external side may present a contour corresponding to a contour on an opening of the bracket that receives the handle, both contours may merge in the rest position of the first lever and second lever; the second extremity of the handle may be configured to be pushed into the bracket for lowering the second lever in activation position; the user may activate the handle by pushing the second extremity of the handle into the bracket; the handle may be configured to rotate taking support on a rest portion of the bracket, the first extremity of the handle protrudes from the bracket and rotates the first lever around its pivot connection with the bracket from its rest position to an intermediate position; there may be no activation clearance and the handle as a whole cannot translate in a rectilinear manner within the bracket; there may be a rotation of the handle taking support on the rest portion; the user may push on the second extremity to rotate handle for moving the second lever in activation position; the rest portion is placed between the first and second extremities of the handle; the rotation of the first lever is not transmitted to the second lever by the first rod due to the pivot-slide connection of the first rod with anyone of the first or second lever; when the first lever and the second lever are both in rest position, the inside of the handle rests on the rest portion of the bracket; the geometry of the rest portion is similar but there is no activation clearance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
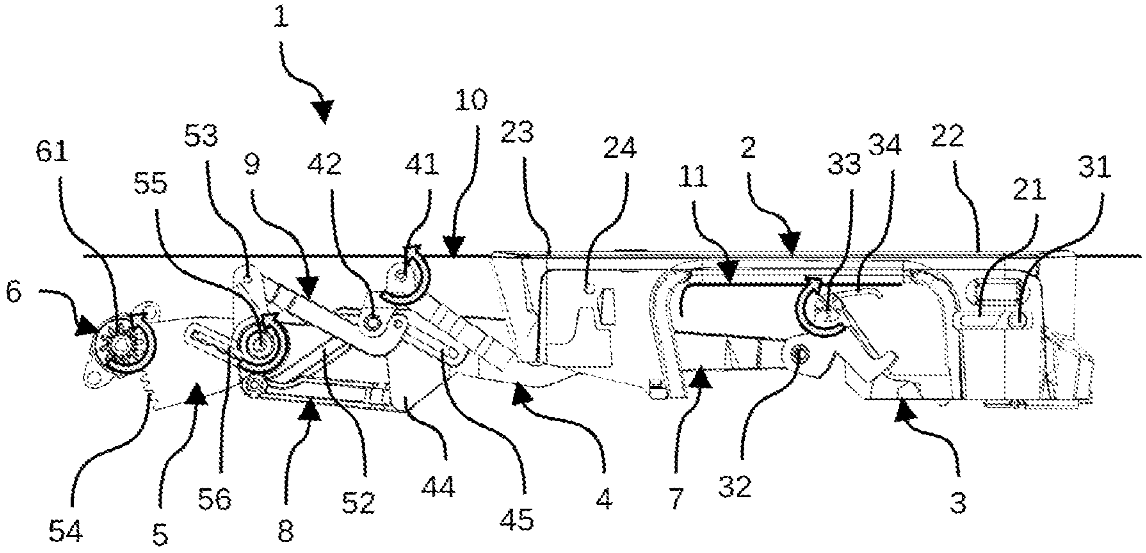
FIG. 1 is a top view of a schematic representation of a first side of a vehicle door assembly according to the present disclosure, illustrated in a rest position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
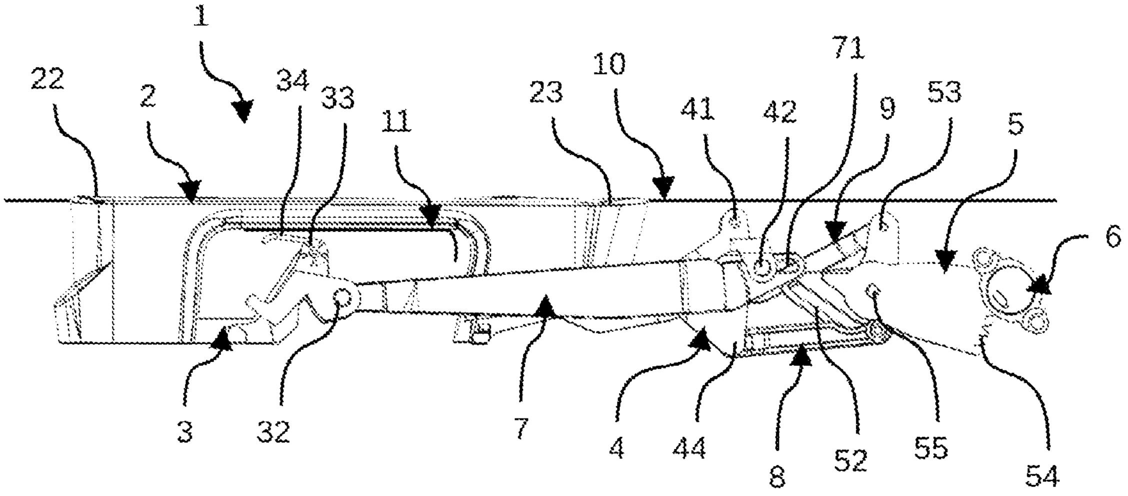
FIG. 2 is a bottom view of a schematic representation of a second side of a vehicle door assembly according to the present disclosure, illustrated in a rest position.

FIGS. 1 and 2 show a vehicle door handle assembly 1 in a rest position. The vehicle door handle assembly 1 includes a bracket 10 and a handle 2. The bracket 10 is designed to be fixed on the vehicle door (not represented). In this rest position, the handle 2 is retracted into the bracket 10 in order to be at the same level of the door body when installed.

The handle 2 includes a first extremity 22 and a second extremity 23 opposed to the first extremity 22. The first extremity 22 of the handle 2 is connected to a first lever 3 and the second extremity 23 of the handle 2 is connected to a second lever 4.

The first lever 3 is also designed to be connected to an opening lever (not represented) to open a latch of the vehicle door. The first lever 3 is designed to rotate between a rest position (represented in FIGS. 1 and 2) where the first extremity 22 of the handle 2 is in a rest position, a deployed position (represented in FIGS. 3 to 6) where the first extremity 22 of the handle 2 is in a deployed position outside the bracket 10, and an opening position (represented on FIGS. 7 and 8) where the first lever 3 actuates the opening lever.

More precisely, the first lever 3 includes a pivot connection 33 with the bracket 10 around which the first lever 3 rotates between its different positions. A first extremity of the first lever 3 is connected to the first extremity 22 of the handle 2 and a second extremity of the first lever 3 is connected to the opening lever, in particular, due to a pivot connection 32 and the shape of the first lever 3, the first lever 3 can touch the opening lever during the movement.

The connection between the first lever 3 and the first extremity 22 of the handle may be a pivot-slide connection. In the examples represented FIGS. 1, 3, 5, and 7, the first extremity 22 of the handle 2 includes a slide opening 21 and the first lever 3 includes a recess 31 for example to receive a pin (not represented). The first lever 3 may also include an elastic device 34 passively bringing back the first lever 3 from its deployed position to its rest position (i.e., biasing the first lever 3 toward its rest position). This elastic device 34 may be a spring positioned for example on the pivot connection 33 between the first lever 3 and the bracket 10. The torque applied by this elastic device 34 is represented by a grey arrow in FIGS. 1 to 8.

The second extremity 23 of the handle 2 is connected to a second lever 4. The second lever 4 is designed to rotate between a rest position (represented in FIGS. 1 and 2) where the second extremity 23 of the handle 2 is in a rest position, an activation position (represented in FIGS. 3 and 4 and 10 according to an alternative) where the second extremity 23 of the handle 2 lowers the second lever 4 into the bracket 10, and a deployed position (represented in FIGS. 5 to 8) where the second extremity 23 of the handle 2 is in a deployed position outside the bracket 10.

More precisely, the second lever 4 includes a pivot connection 41 with the bracket 10 around which the second lever 4 rotates between its different positions. A first extremity of the second lever 4 is connected to the second extremity 23 of the handle 2. This connection may be a pivot connection 24. The second lever 4 may also include an elastic device (not represented) passively rotating the second lever 4 to its deployed position (i.e., biasing the second lever 4 toward its deployed position). This elastic device may be a spring positioned for example on the pivot connection 41 between the second lever 4 and the bracket 10. The torque applied by this elastic device is represented by a grey arrow in FIGS. 1 to 8.

The first lever 3 and the second lever 4 may be connected together with at least one first rod 7 in order to synchronize the movements of the two levers 3, 4. More exactly, the first rod 7 transmits the rotation of the second lever 4 from its activation position to its deployed position to the first lever 3, rotating the first lever 3 from its rest position to its deployed position. The first rod 7 may include a pivot-slide connection with anyone of the first lever 3 or the second lever 4 so that the first lever 3 can rotate from its rest position to its deployed position or from its deployed position to its opening position without rotating the second lever 4. In the example illustrated in FIGS. 1 to 8, the first rod 7 includes a first extremity connected to a second extremity of the first lever 3 by a pivot connection 32. The first rod 7 includes a second extremity connected to the second lever 4 by pivot-slide connection. The second extremity of the first rod 7 includes a slide 71 and the second extremity of the second lever 4 includes a pin 42 inserted into the slide 71. The handle 2, the first lever 3, the second lever 4 and the first rod 7 are designed and connected like a parallelogram and move together synchronously. The other connection of the first rod 7 with anyone of the first lever 3 or the second lever 4 may be a pivot connection.

The vehicle door handle assembly 1 also includes a return lever 5 having a first extremity connected to a second extremity of the second lever 4, the return lever 5 being designed to rotate between a first position (represented in FIGS. 1 and 2) and a second position (represented in FIGS. 3 to 8). More precisely, the return lever 5 includes a pivot connection 55 with the bracket 10 around which the return lever 5 rotates between its different positions. The return lever 5 also includes an elastic device 56 passively bringing back the return lever 5 to its first position. This elastic device 56 may be a spring positioned for example on the pivot connection 55 between the return lever 5 and the bracket 10. The torque applied by this elastic device 56 is represented by a grey arrow on FIGS. 1 to 8.

The rotation of the second lever 4 to its activation position actuates the rotation of the return lever 5 from its first to its second position. The passive rotation of the return lever 5 from its second to its first position actuates the rotation of the second lever 4 from its deployed position to its rest position.

The second lever 4 and the return lever 5 are connected together by a second rod 8 and a third rod 9. The second rod 8 transmits the rotation of the second lever 4 from its rest position to its activation position to the return lever 5, rotating the return lever 5 from its first position to its second position. The third rod 9 transmits the rotation of the return lever 5 from its second position to its first position to the second lever 4, rotating the second lever 4 from its deployed position to its rest position. The second rod 8 and the third rod 9 are placed on the return lever 5 on either side of the pivot connection 55 of the return lever 5 with the bracket 10. The second rod 8 and the third rod 9 are placed on the second extremity of second lever 4 on the same side of the pivot connection 41 of the second lever 4 with the bracket 10.

The second rod 8 may include a pivot-slide connection 52 with anyone of the second lever 4 or return lever 5. In the example illustrated in FIGS. 1 to 8, the pivot-slide connection 52 is placed between the return lever 5 and the second rod 8. The return lever 5 includes the slide of the pivot-slide connection 52 and the second rod 8 includes a pin inserted in the slide. Still according to the example illustrated in FIGS. 1 to 8, the connection between the second rod 8 and the second lever 4 is a pivot connection 44. The other connection of the second rod 8 with any of the second lever 4 or return lever 5 may be a pivot connection.

The third rod 9 may include a pivot-slide connection 45 with any of the second lever 4 or return lever 5. In the example illustrated in FIGS. 1 to 8, the pivot-slide connection 45 is placed between the second lever 4 and the third rod 9. The second lever 4 includes the slide of the pivot-slide connection 45 and the third rod 9 includes a pin inserted in the slide. Still according to the example illustrated in FIGS. 1 to 8, the connection between the third rod 9 and the return lever 5 is a pivot connection 53. The other connection of the third rod 9 with any of the second lever 4 or return lever 5 may be a pivot connection.

The return lever 5, more exactly its second extremity, is connected to a delay element 6 which slows down the passive rotation of the return lever 5 from its second to its first position. This delay element 6 may include at least one damper as illustrated in FIGS. 1 to 8. The at least one damper 6 may include a gearwheel 61 and the extremity of the return lever 5, connected to the at least one damper 6, includes an arc portion with teeth 54 engaged with the gearwheel 61. The torque applied by this at least one damper 6 is represented by a grey arrow on FIGS. 1 to 8.

The FIGS. 1 to 8 represent different positions and sequential steps of the deployment, opening and retraction of the handle 2.

As described above, FIGS. 1 and 2 are a representation of a rest position where the handle 2 is retracted into the bracket 10 in order to be at the same level of the door body when installed. The first lever 3 is in its rest position and maintained in this rest position by the elastic device 34. The second lever 4 is in its rest position and the return lever 5 is in its first position. The return lever 5 is maintained in its first position by the elastic device 56. The elastic device 56 of the return lever 5 is stronger than the elastic device of the second lever 4 in order that the return lever 5 in its first position maintained the second lever 4 in its rest position. The elastic device 56 of the return lever 5 is also stronger than the delay element 6 in order to maintain the return lever 5 in its first position. In this rest position, the inside of the handle 2 may also rest on a rest portion 11 of the bracket 10 placed between the first extremity 22 and the second extremity 23 of the handle 2.

Figure 3:
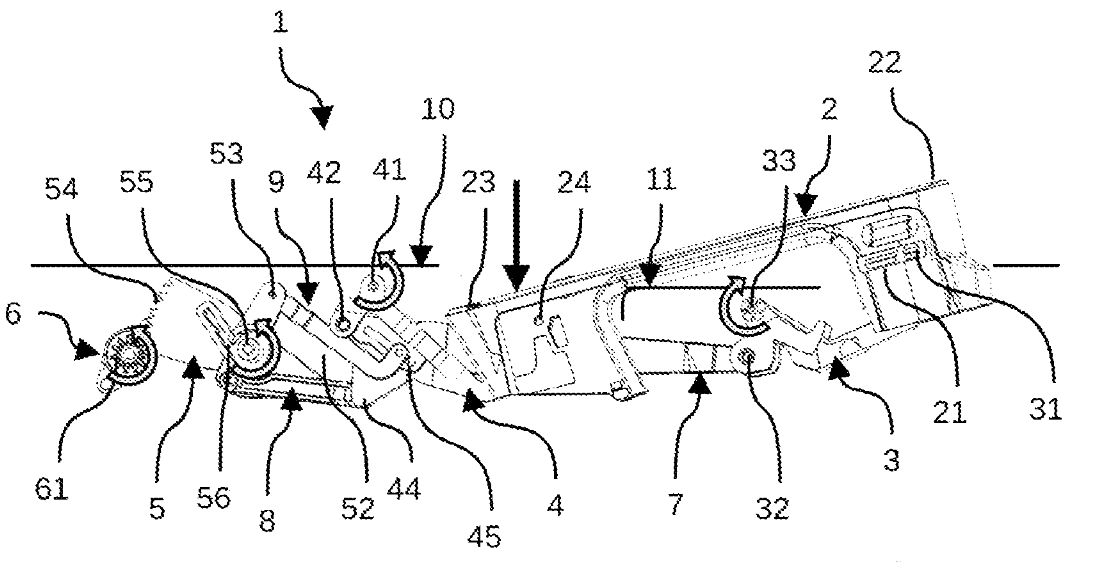
FIG. 3 is a top view of a schematic representation of a first side of a vehicle door assembly according to the present disclosure, illustrated in an activation position according to an activation by rotation alternative.
Figure 4:
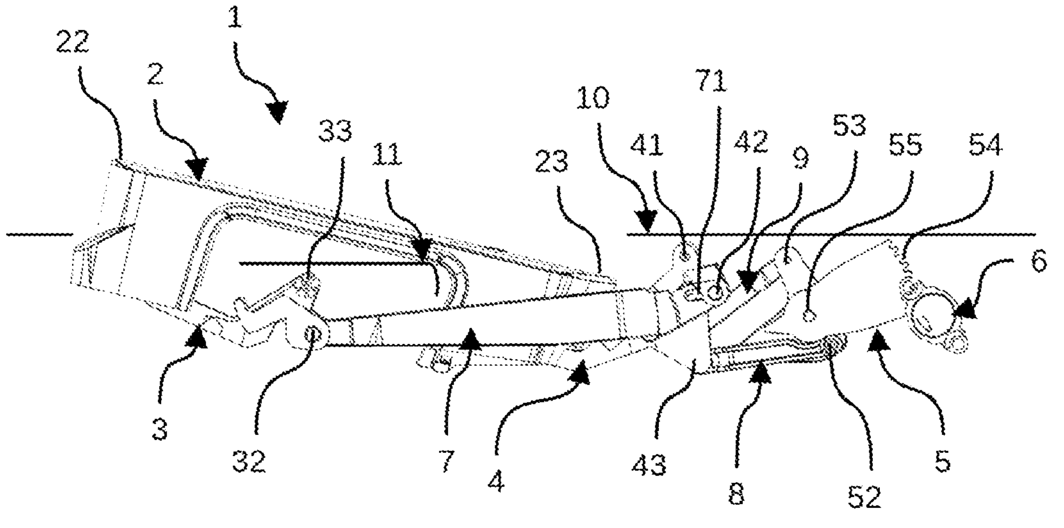
FIG. 4 is a bottom view of a schematic representation of a second side of a vehicle door assembly according to the present disclosure, illustrated in an activation position according to the activation by rotation form.

FIGS. 3 and 4 represent an activation position of the handle 2 according to an activation by rotation alternative where the user activates the handle 2 by pushing the second extremity 23 of the handle 2 into the bracket 10. Due to this push, the handle 2 rotates taking support on the rest portion 11 of the bracket 10. The first extremity 22 of the handle 2 protrudes from the bracket 10 and rotates the first lever 3 around its pivot connection 33 with the bracket 10 from its rest position to an intermediate. The rotation of the first lever 3 is not transmitted to the second lever 4 by the first rod 7 due to the pivot-slide connection of the first rod 7 with anyone of the first lever 3 or the second lever 4.

The push of the second extremity 23 of the handle 2 rotates the second lever 4 around its pivot connection 41 with the bracket 10 from its rest position to its activation position. The rotation of the second lever 4 causes the rotation of the return lever 5 around its pivot connection 55 with the bracket 10 from its first to its second position. In the example illustrated in FIGS. 3 and 4, the transmission of the rotation of the second lever 4 to the return lever 5 is made by the second rod 8 which pushes one side of the return lever 5 causing its rotation. Indeed, the rotation of the second lever 4 to its activation position makes the second rod 8 slide in its slide-pivot connection with anyone of the second lever 4 or the return lever 5, bringing the second rod 8 to abutment with and pushing the return lever 5. The third rod 9 slides in its slide-pivot connection with anyone of the second lever 4 or the return lever 5 without affecting the rotation of anyone of these levers 4, 5. The rotation of the second lever 4 is made against the torque of its elastic device and the rotation of the return lever 5 is made against the torque of its elastic device 56.

Figure 10:
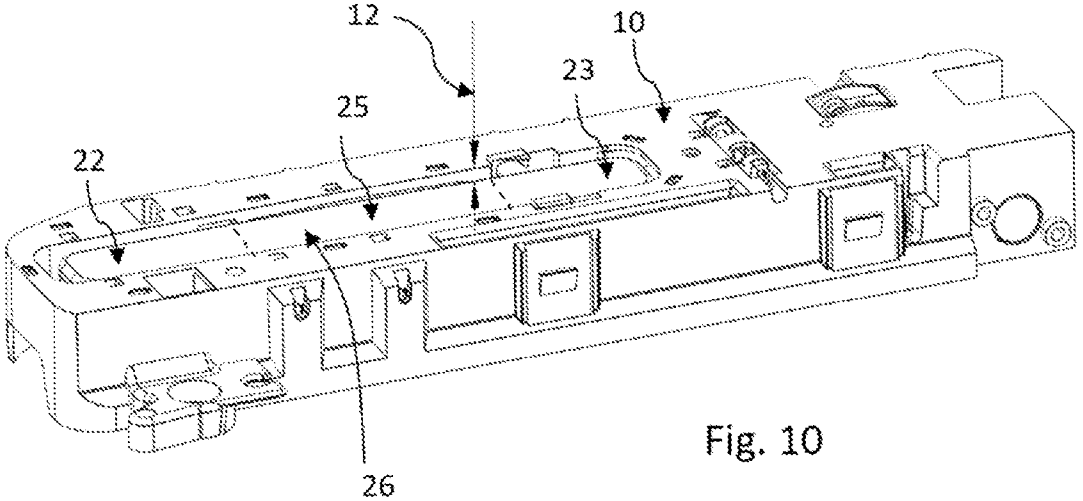
FIG. 10 is a perspective view of a vehicle door assembly according to the present disclosure, illustrated on the activation position according to an activation by translation form.

FIG. 10 presents an activation by translation alternative, wherein there is an activation clearance 12 within the bracket 10 so that the handle 2 can be moved in a rectilinear manner from its rest position to the activation position as depicted.

The handle 2 is pushed into the bracket for lowering the second lever 4 in activation position.

Due the presence of the activation clearance 12, the handle 2 moves in a rectilinear manner when pushing the handle into the bracket 10. Thus, the handle is considered as a whole to be pushed by the user into the bracket. There is no rotation of the handle when a user is pushing on the handle.

The handle 2 is configured to abut on the rest portion 11 of the bracket 10 in the activation position, the handle 2 being distant from the rest portion 11 when the first lever 3 and second lever 4 are both in rest position.

The handle 2 presents an external side 26 facing the outside of the bracket 10; any part of the external side 26 being configured to be pushed towards the bracket 10 for lowering the second lever 4 in activation position.

The handle includes a leg 25 linking the first extremity and the second extremity. The leg 25, the first extremity and the second extremity are each presenting a corresponding portion of the external side 26.

The external side 26 may present a contour corresponding to a contour on an opening of the bracket that receives the handle. In one form, both contours merge in the rest position of the first lever and second lever. In other words, in the rest position, both contours are at a corresponding level transversally to an extension plan of the external side 26.

Both the alternatives with an activation by rotation and an activation by translation are compatible with the other constructional features herein described. Only the position of the rest portion 11 differs. The rest portion 11 is deeper within the bracket 10 according to the activation by translation alternative.

Figure 5:
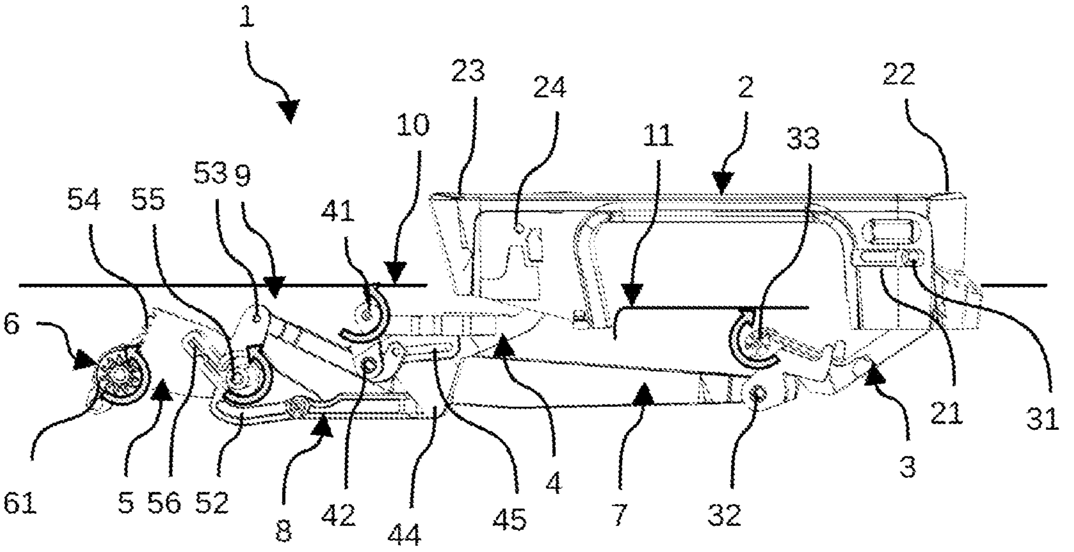
FIG. 5 is a top view of a schematic representation of a first side of a vehicle door assembly according to the present disclosure, illustrated in a deployed position.
Figure 6:
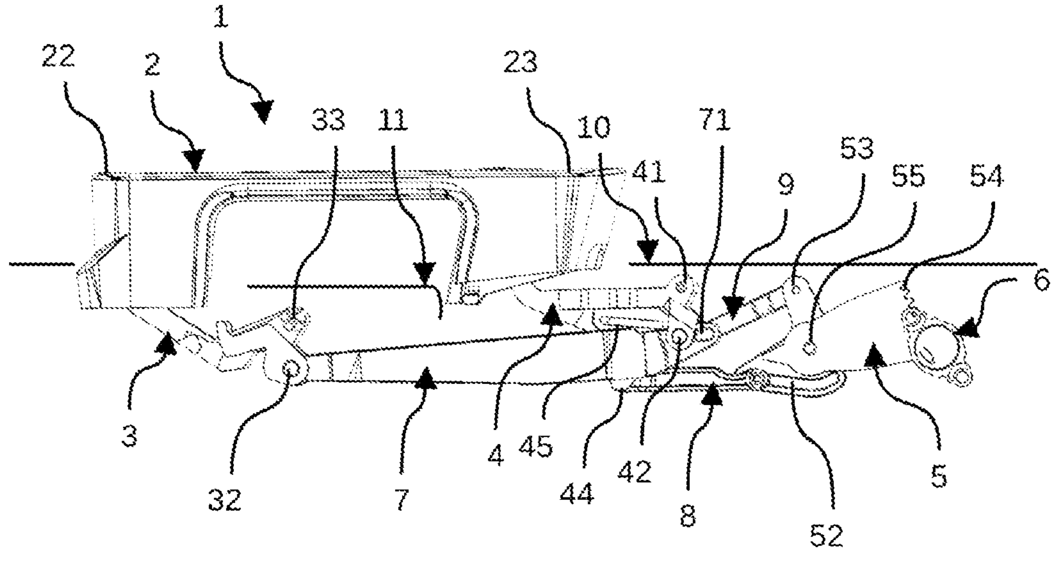
FIG. 6 is a bottom view of a schematic representation of a second side of a vehicle door assembly according to the present disclosure, illustrated in a deployed position.

FIGS. 5 and 6 represent a deployed position of the handle 2 where the first lever 3 is still in its deployed position and where the second lever 4 has rotated from its activation position to its deployed position, bringing the second extremity 23 of the handle 2 in its deployed position outside the bracket 10. When the user stops pushing on the second extremity 23 of the handle 2, the elastic device of the second lever 4 allows the passive rotation of the second lever 4 to its deployed position. The rotation of the second lever 4 is not transmitted to the return lever 5 by any of the second rod 8 or the third rod 9 which slide with their pivot-slide connections. The first lever 3 is maintained in its deployed position due to the first rod 7 which is in abutment with its pivot-slide connection. The return lever 5 is still on its second position due to the delay element 6. The third rod 9 is in abutment in order to stop the rotation of the second lever 4 in its deployed position against the torque of its elastic device 34.

Figure 7:
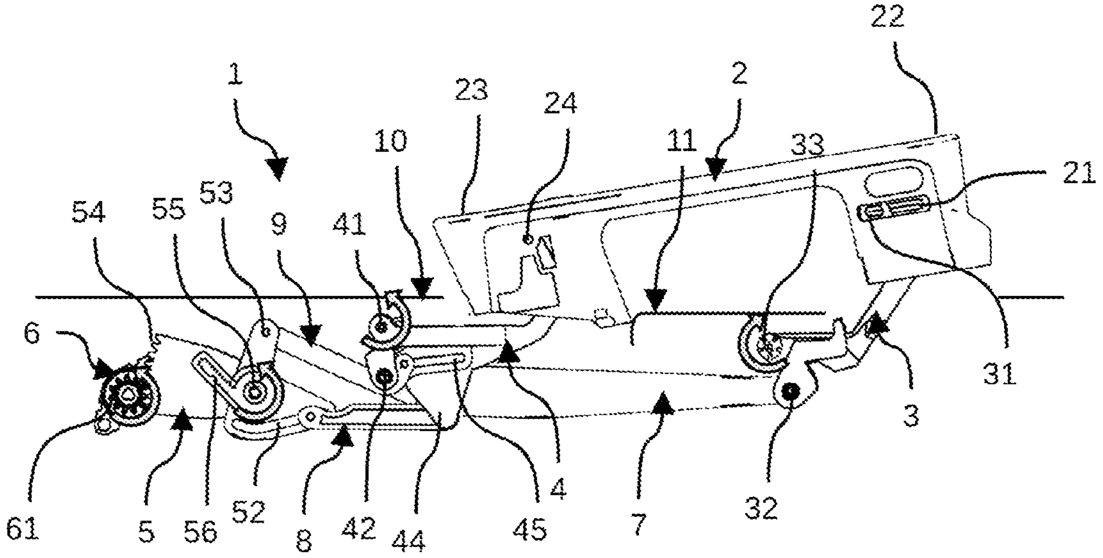
FIG. 7 is a top view of a schematic representation of a first side of a vehicle door assembly according to the present disclosure, illustrated in an opening position.
Figure 8:
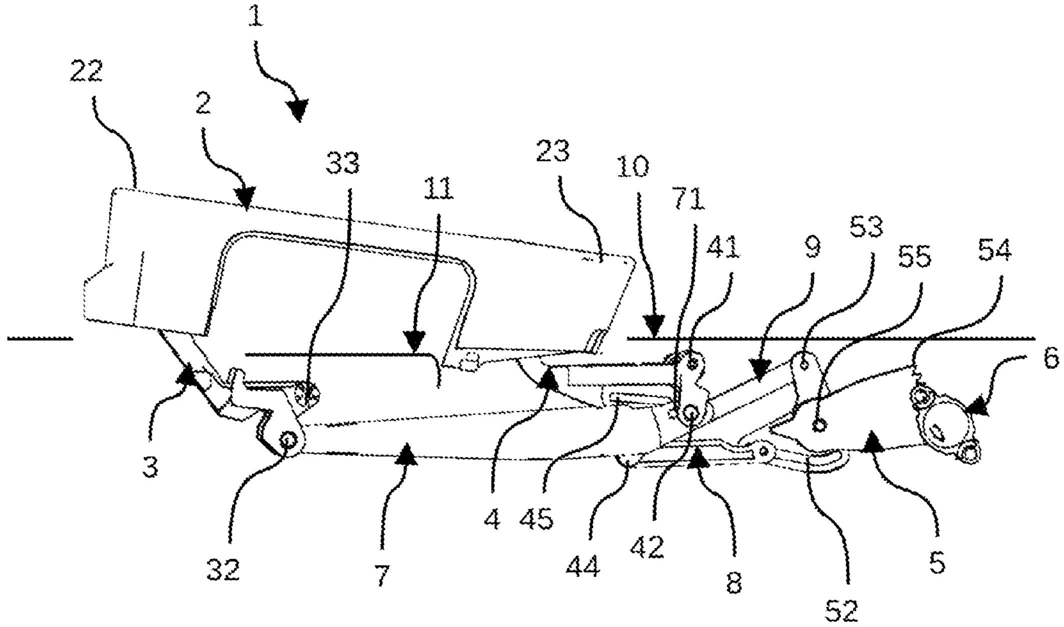
FIG. 8 is a bottom view of a schematic representation of a second side of a vehicle door assembly according to the present disclosure, illustrated in an opening position.

FIGS. 7 and 8 represent an opening position of the handle where the user can grab the handle and pull it or has taken the handle and pulled it in order to open the vehicle door. When the user pulls the handle 2, it rotates around the pivot connection 24 between the second extremity 23 of the handle 2 and the second lever 4. The first extremity 22 of the handle 2 is pulled in an opening position rotating the first lever 3 from its deployed position to its opening position. The rotation of the first lever 3 is not transmitted to the second lever 4 by the first rod 7 due to its pivot-slide connection. When the user releases the handle 2, the first lever 3 rotates back to its deployed position due to its elastic device 34.

The delay element 6 slows down the passive return rotation of the return lever 5 from its second position to its first position. When the return lever 5 rotates from its second to its first position, it also transmits its rotation to the second lever 4 in order to rotate the second lever 4 from its deployed position to its rest position. In the example illustrated in FIGS. 7 and 8, when the return lever 5 rotates to its first position, the third rod 9 is in abutment in order to pull back the second lever 4 in its rest position against the torque of the elastic device of the second lever 4. The rotation of the second lever 4 and the first lever 3 to their rest position are synchronous due to the first rod 7. Thus, the handle 2 translates from its deployed position (FIGS. 5 and 6) to its rest position (FIGS. 1 and 2). This translation is slowed down and progressive due to the delay element 6.

Figure 9:
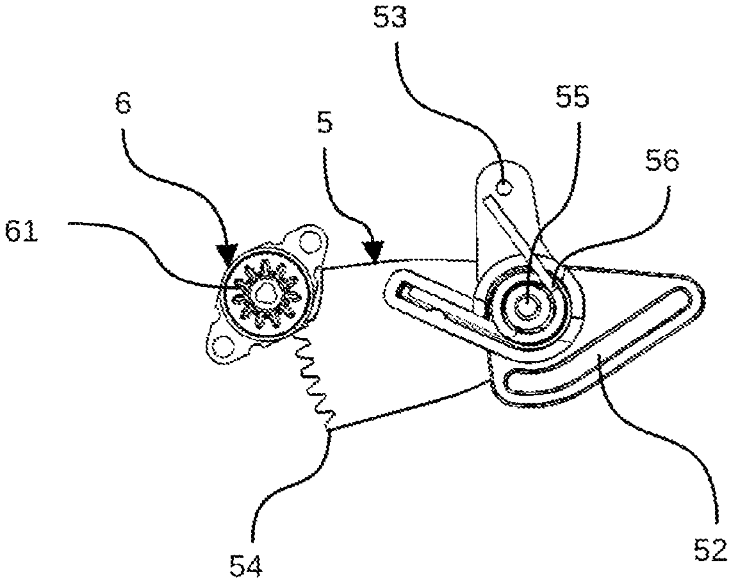
FIG. 9 is a schematic representation of a second lever according to the present disclosure.

In a particular form illustrated in FIG. 9, the extremity of the return lever 5 connected to the at least one damper 6 may includes a portion without teeth 54 in order to disconnect the return lever 5 of the at least one damper 6 before the return lever 5 reaches its first position. This form allows accelerating the return of the return lever 5 at the end and so accelerating the translation of the handle 2 from its deployed position to its rest position when the handle 2 is near its rest position.

Figure 11A:
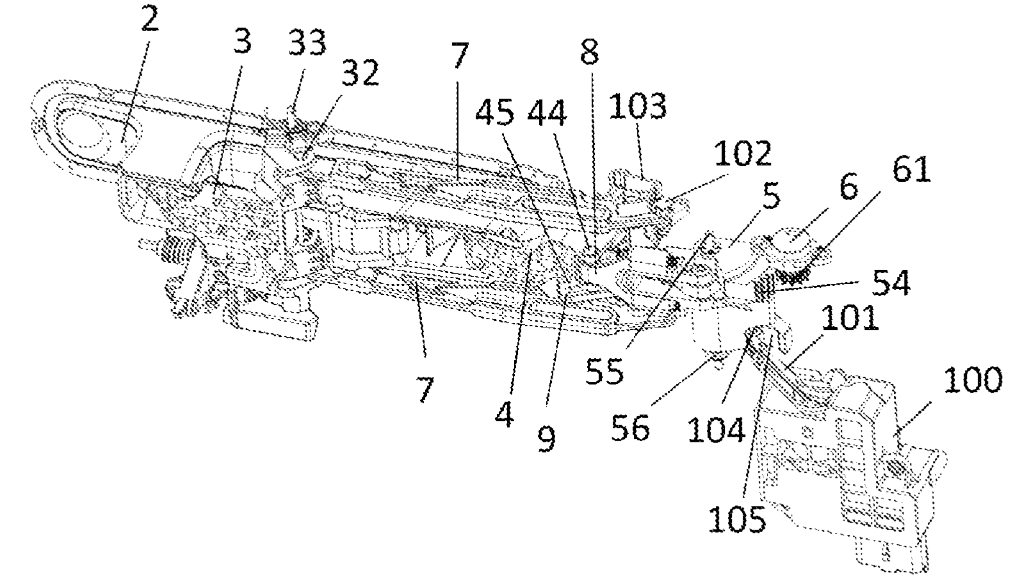
FIG. 11A is a schematic view of a vehicle door assembly according to the present disclosure, illustrated in a rest position.
Figure 11B:
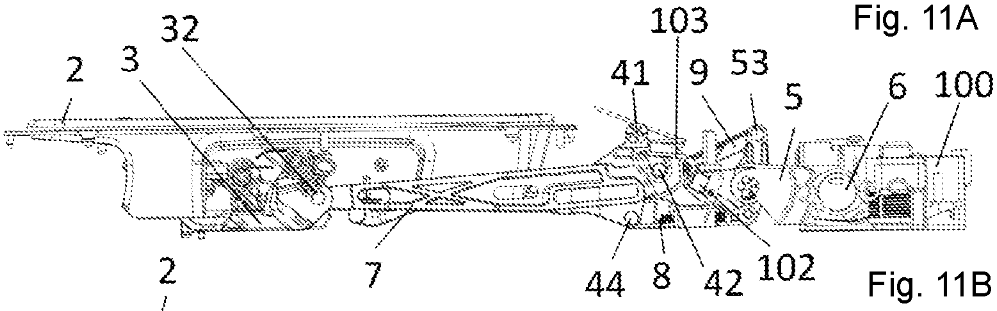
FIG. 11B is a top view of a schematic representation of a first side of a vehicle door assembly according to the present disclosure, illustrated in a rest position.
Figure 11C:
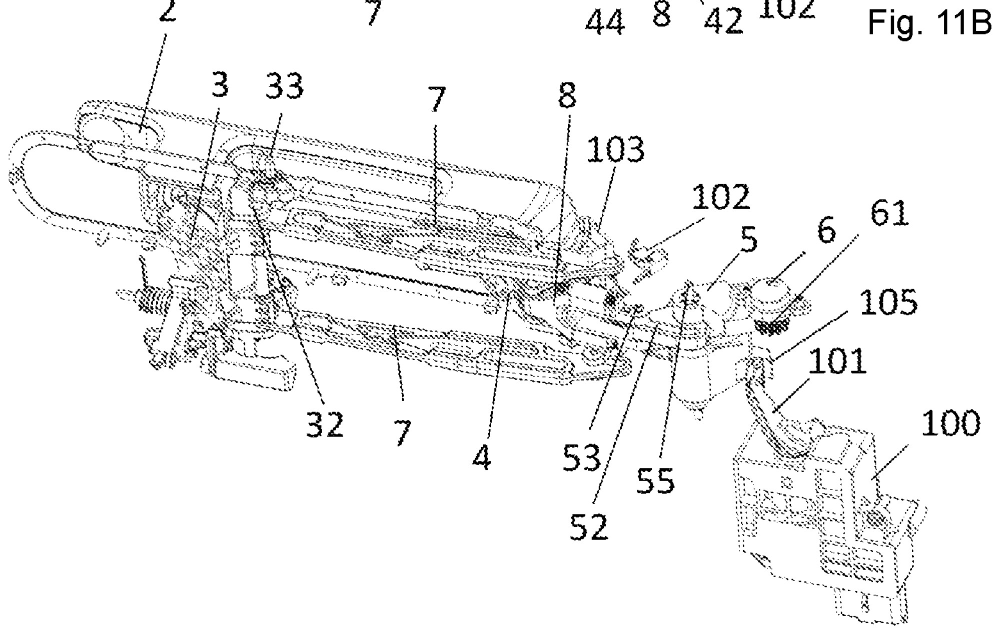
FIG. 11C is a schematic view of a vehicle door assembly according to the present disclosure, illustrated in a deployed position.

FIGS. 11A to 11C show another form in which pressing on the handle can be done with a lower force or a shorter distance to move the handle 2 from the flush position to the deployed position. For this purpose, an actuator 100 is arranged within the bracket 10. The actuator 100 has an actuator lever 101, which is connected to an output shaft of the actuator 100 and is moved by the actuator 100.

The actuator lever 101 is in contact with the return lever 5, so that when the actuator lever 101 is moved, the return lever 5 is also moved and thus the handle 2 is moved from the flush position to the deployed position.

In one form, a roller 104 is arranged at the end of the actuator lever 101 which is in contact with the return lever 5. This reduces the friction between the return lever 5 and the actuator lever 101. In order to have a defined area for contact between the actuator lever 101 and the return lever 5, a contact area 105 can be arranged on the return lever 5.

In order to control the actuator 100, a sensor arrangement is arranged within the bracket 10, which can detect a press on the handle 2. The sensor arrangement may consist of a cam 103 and at least one switch 101.

To move the handle from the flush position (FIG. 11A) to the deployed position (FIG. 11C), the handle 2 must be pressed at any area of the handle 2, and this pressing is then detected by the sensor arrangement. Based on the detection of the pressing on the handle 2, a controller of the actuator 100 activates the actuator 100 and the handle is moved to the deployed position.

As soon as the handle 2 is in the deployed position, the actuator 100 and thus also the actuator lever 101 moves back to the flush position. Due to the elastic device 56 and the damper 6, the handle 2 is always automatically returned passively to its first position. This prevents the handle 2 from remaining in the deployed position and thus being damaged.

Figure 12A:
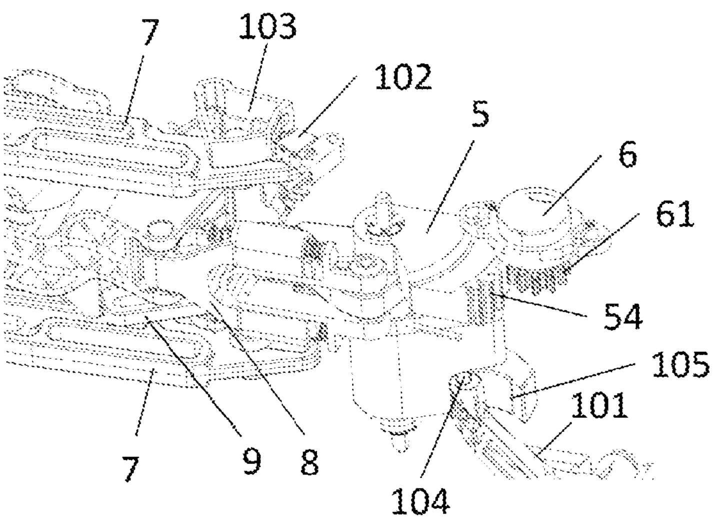
FIG. 12A is a view of a section of a vehicle door assembly according to the present disclosure, illustrated in a rest position.
Figure 12B:
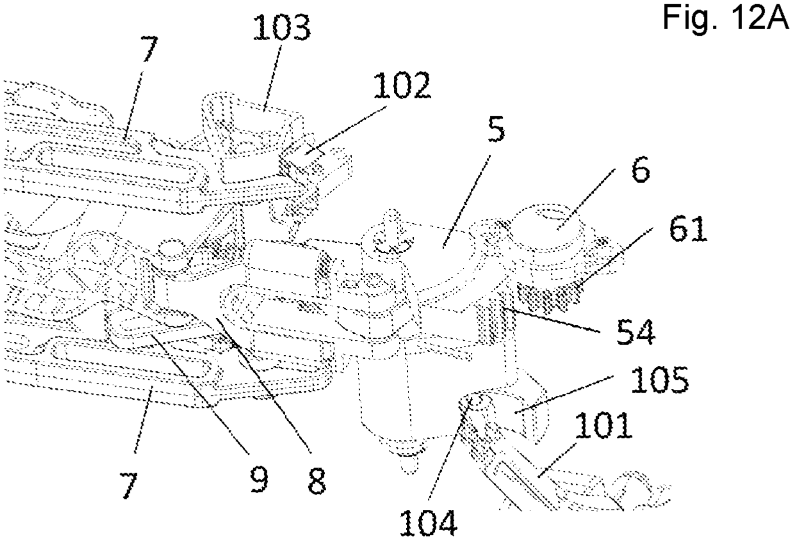
FIG. 12B is a view of a section of a vehicle door assembly according to the present disclosure, illustrated in an activation position.
Figure 12C:
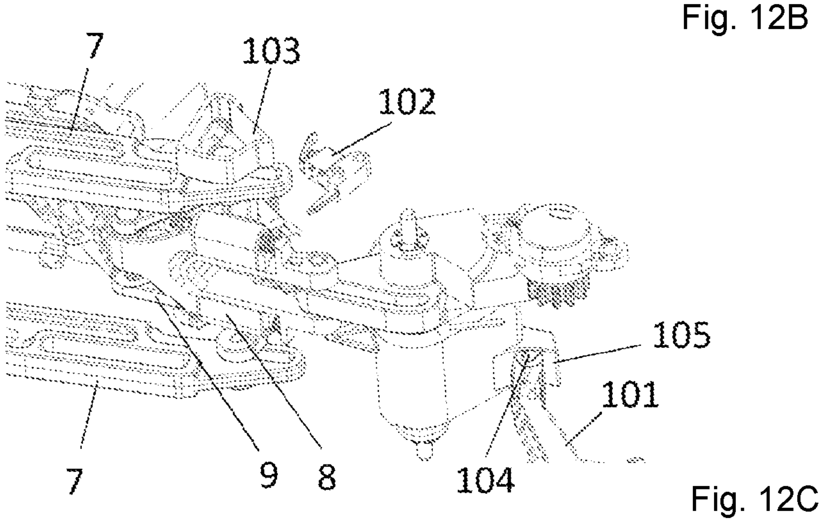
FIG. 12C is a view of a section of a vehicle door assembly according to the present disclosure, illustrated in a deployed position.

FIGS. 12A to 12C show a view of a section of a vehicle door assembly 1 in a rest position (FIG. 12A), a view of a section of a vehicle door assembly 1 in an activation position (FIG. 12B) and a view of a section of a vehicle door assembly 1 in a deployed position (FIG. 12C). Thus, sensor arrangement according to the present disclosure includes a cam 103 rotatably movable around the pin 42 of the pivot connection of the second lever 4 with first rod 7, the pin being fixed relative to the handle 2. The cam 103 may be rotatably secured to the second lever 4, which is rotatably movable around the pin 42, so that an angular position of the cam 103 around the pin 42 is directly related to an angular position of the second lever 4 around the pin 42, the angular position of the second lever 4 being also mechanically related to the position of the handle 2. The device further includes one or several switch(es) 102, the one or several switch(es) 102 being secured to the bracket 10. The one or several switch(es) 102 is configured to be in electrical contact with a complementary member of the cam 103, when the angular position of the cam 103 is equal to one or more predetermined angular position(s) around the pin 42.

The sensor arrangement may be considered as split in different parts, or as in a single box including all elements. Thus, for example, the sensor arrangement can include a housing member, such as a box, configured to be secured to the bracket 10, the cam 103 and the one or several switch(es) 102 being lodged inside the housing member D, the one or several switch(es) 102 being secured to the housing member.

According to these provisions, switches 102 are centralized. This has the advantage of focusing accuracy in one element only, i.e., the sensor arrangement, and to optimize the industrialization flow with one fitting operation, one operation of sealing, and localization of wire layout.

In the flush position, the switch 102 is in contact with a first area of the cam 103 (FIG. 12A). As soon as the handle 2 is pressed, the switch 102 comes into contact with a second area of the cam 103 (FIG. 12B). The second area of the cam 103 actuates the switch 102 and a signal is sent to the controller of the actuator 100 that the handle 2 should be deployed. As soon as the handle 2 is fully deployed, the switch 102 has no contact with the cam 103. In order to detect the deployed position of the handle 2, there can only be no contact between the switch 102 and the cam 103 when the handle 2 is in the deployed position. Alternatively, for example, the angle of rotation of the actuator 100 can be detected or the current of the motor can be measured and as soon as this exceeds a limit value, this signals the fully deployed position of the handle 2.

Unless otherwise expressly indicated herein, all numerical values indicating mechanical/thermal properties, compositional percentages, dimensions and/or tolerances, or other characteristics are to be understood as modified by the word “about” or “approximately” in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean “at least one of A, at least one of B, and at least one of C.”

In this application, the term “controller” and/or “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle door handle assembly comprising:

a bracket;

a handle, comprising a first extremity and a second extremity opposed to the first extremity;

a first lever, wherein the first extremity is connected to the first lever, said first lever being configured to be connected to an opening lever of a vehicle door to open a latch of the vehicle door, said first lever being configured to rotate between a rest position where the first extremity of the handle is in a rest position, a deployed position where the first extremity of the handle is in a deployed position outside the bracket, and an opening position where the first lever actuates the opening lever;

a second lever, wherein the second extremity is connected to the second lever, said second lever being configured to rotate between a rest position where the second extremity of the handle is in a rest position, an activation position where the second extremity of the handle lowers the second lever into the bracket, and a deployed position where the second extremity of the handle is in a deployed position outside the bracket;

a return lever having a first extremity connected to the second lever, said return lever being configured to rotate between a first position and a second position, the return lever comprising an elastic device configured to passively bring back said return lever to its first position, wherein the rotation of the second lever to its activation position actuates the rotation of the return lever from its first to its second position, and passive rotation of the return lever from its second position to its first position via the elastic device actuates the rotation of the second lever from its deployed position to its rest position;

an actuator arranged within the bracket, the actuator having an actuator lever connected to an output shaft of the actuator and configured to be moved by the actuator, wherein the actuator lever is in contact with the return lever so that when the actuator lever is moved, the return lever is moved and the handle is moved from its rest position to its deployed position;

a sensor arrangement arranged within the bracket for detecting a press on the handle in the activation position, wherein the handle is configured to be pressed at any area of the handle to move the handle from its rest position to its deployed position; and a controller configured to activate the actuator based on detection of the press on the handle to move the handle to its deployed position, wherein as soon as the handle is in its deployed position, the actuator and the actuator lever move back to the rest position, the handle being always automatically returned passively to its rest position due to the elastic device.

2. The vehicle door handle assembly according to claim 1, wherein the return lever is connected to a delay element which slows down the passive rotation of the return lever from its second to its first position.

3. The vehicle door handle assembly according to claim 2, wherein the delay element comprises at least one damper.

4. The vehicle door handle assembly according to claim 3, wherein the at least one damper comprises a gearwheel and wherein an end the extremity of the return lever connected to the at least one damper comprises an arc portion with teeth engaged with said gearwheel.

5. The vehicle door handle assembly according to claim 4, wherein the end of the return lever connected to the at least one damper comprises a portion without teeth in order to disconnect the return lever of the at least one damper before the said return lever reaches its first position.

6. The vehicle door handle assembly according to claim 1, wherein the first lever comprises an elastic device configured to passively bring back said first lever from its deployed position to its rest position.

7. The vehicle door handle assembly according to claim 1, wherein the second lever comprises an elastic device configured to passively rotate said second lever toward its deployed position.

8. The vehicle door handle assembly according to claim 1, wherein the connection between the first lever and the first extremity of the handle is a pivot-slide connection.

9. The vehicle door handle assembly according to claim 1, wherein the first and second levers are connected together with at least one first rod, said first rod transmitting the rotation of the second lever from its activation position to its deployed position to the first lever, rotating said first lever from its rest position to its deployed position.

10. The vehicle door handle assembly according to claim 9, wherein the first rod comprises a pivot-slide connection with anyone of the first lever or the second lever so that the first lever can rotate from its rest position to its deployed position or from its deployed position to its opening position without rotating the second lever.

11. The vehicle door handle assembly according to claim 1, wherein the second and the return levers are connected together by a second and a third rods, said second rod transmitting the rotation of the second lever from its rest position to its activation position to the return lever, rotating said return lever from its first position to its second position, said third rod transmitting the rotation of the return lever from its second position to its first position to the second lever, rotating said second lever from its deployed position to its rest position.

12. The vehicle door handle assembly according to claim 11, wherein the second rod comprises a pivot-slide connection with anyone of the second lever or the return lever.

13. The vehicle door handle assembly according to claim 11, wherein the third rod comprises a pivot-slide connection with anyone of the second lever or the return lever.

14. The vehicle door handle assembly according to claim 1, wherein the handle is configured to be pushed into the bracket for lowering the second lever in the activation position.

15. The vehicle door handle assembly according to claim 14, wherein the handle is configured to move in a rectilinear manner when pushing the handle into the bracket.

16. The vehicle door handle assembly according to claim 15, wherein the handle is configured to abut on a rest portion of the bracket in the activation position, the handle being distant from said rest portion when the first lever and second lever are both in rest position.

17. The vehicle door handle assembly according to claim 14, wherein the handle presents an external side facing an outside of the bracket, wherein any part of the external side is configured to be pushed towards the bracket for lowering the second lever in the activation position.

18. The vehicle door handle assembly according to claim 1, wherein the second extremity of the handle is configured to be pushed into the bracket for lowering the second lever in the activation position.

19. The vehicle door handle assembly according to claim 18, wherein the handle is configured to rotate taking support on a rest portion of the bracket, wherein the first extremity of the handle protrudes from the bracket and rotates the first lever around its pivot connection with the bracket from its rest position to an intermediate position.

20. The vehicle door handle assembly according to claim 19, wherein when the first lever and the second lever are both in rest position, an inside of the handle rests on the rest portion of the bracket.

* * * * *